Figure 1:
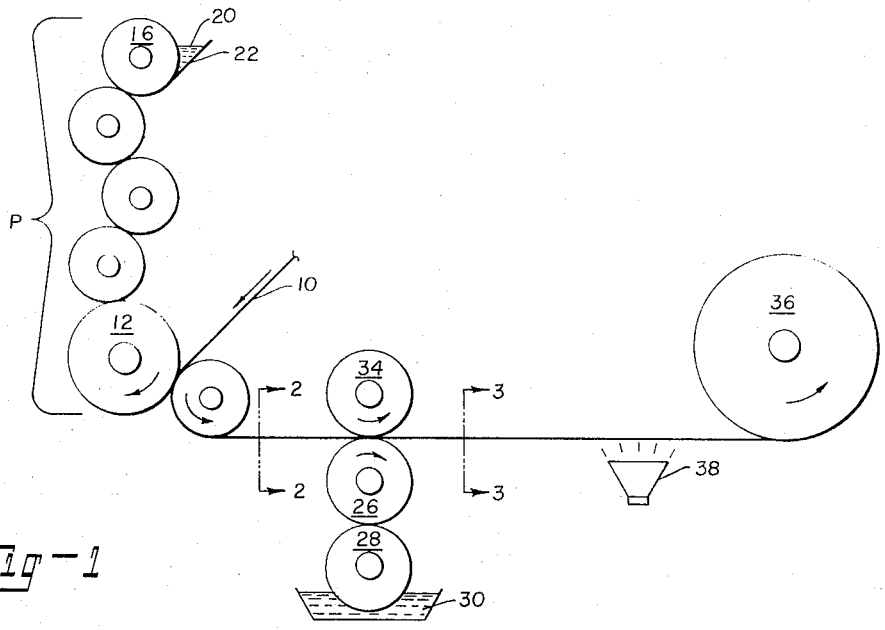
Figure 2:
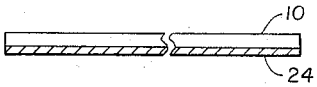
Figure 3:
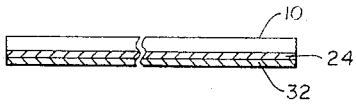

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 27, 1973

916 O.G. 1211

T916,003

PRINTING PROCESS

Charles H. Coney, 2008 Canterbury Road 37660, and Glenna E. Burnett, 1701 John B. Dennis Bypass, A–18 37664, both of Kingsport, Tenn.

Continuation of application Ser. No. 117,593, Feb. 22, 1971. This application Dec. 11, 1972, Ser. No. 313,728

Int. Cl. D21h *1/10*

U.S. Cl. 117—15

1 Sheet Drawing. 11 Pages Specification

Cellulose propionate having a propionyl content of at least about 35%, an acetyl content of less than 4.5%, a hydroxyl content of between about 4.4% and about 12%, and an intrinsic viscosity of between about 0.02 and 20 seconds as measured by ASTM D–1343, is prepared by conventional procedures. Coating or printing compositions are prepared therefrom by dissolving the propionate in a blend of alcohol and water. The coating is applied to lithographic paper, preferably using printing rolls, over a wet ink coating of between 0.1 to 0.2 mil. Thickness of the cellulose propionate coating is normally between 0.1 to 0.2 mil. There is no sign of ink smear or incompatibility of the coating and ink. The coating appears thoroughly dry without the use of auxiliary heating means in about 3 seconds. The ink, which is still wet under the cellulose propionate coating, does not smear by moderate rubbing or when sheets thereof are stacked. Adhesion to both the wet ink and paper, gloss, and scuff resistance, are good. The coated paper is tested for repulpability and there is no sign of flakes of coating in a reformed sheet upon examination under a microscope.

Nov. 27, 1973 C. H. CONEY ET AL T916,003

PRINTING PROCESS

Original Filed Feb. 22, 1971

CHARLES H. CONEY
GLENNA E. BURNETT
INVENTORS

BY John F. Stevens

ATTORNEYS